United States Patent
Alpers et al.

(10) Patent No.: US 7,404,075 B2
(45) Date of Patent: Jul. 22, 2008

(54) METHOD, SYSTEM AND COMPUTER PROGRAM PRODUCT FOR GENERIC AND FLEXIBLE COLLECTION OF A HARDWARE DATA IMAGE

(75) Inventors: Jens Alpers, Stuttgart (DE); Terry S. Biberdorf, Pine Island, MN (US); Astrid C. Kreissig, Herrenberg (DE); Meghna Paruthi, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 455 days.

(21) Appl. No.: 11/239,504

(22) Filed: Sep. 29, 2005

(65) Prior Publication Data

US 2007/0074016 A1    Mar. 29, 2007

(51) Int. Cl.
*G06F 9/00* (2006.01)
*G06F 11/00* (2006.01)
(52) U.S. Cl. .................. 713/100; 713/1; 713/2
(58) Field of Classification Search ........... None
See application file for complete search history.

(56) References Cited

U.S. PATENT DOCUMENTS

| | | | |
|---|---|---|---|
| 5,377,337 A | 12/1994 | Antognini et al. | |
| 5,495,614 A | 2/1996 | Brent et al. | |
| 5,671,441 A | 9/1997 | Glassen et al. | |
| 5,875,484 A * | 2/1999 | Neuhard et al. | 711/167 |
| 6,973,517 B1 * | 12/2005 | Golden et al. | 710/104 |
| 2005/0071514 A1 | 3/2005 | Anderson et al. | |
| 2006/0259830 A1 * | 11/2006 | Blevin et al. | 714/45 |

* cited by examiner

*Primary Examiner*—Dennis M Butler
(74) *Attorney, Agent, or Firm*—Casimer K. Salys; Dillon & Yudell LLP

(57) ABSTRACT

A method of processing data is proposed. In response to determining that a reconfiguration of a data processing system has occurred, one or more system items are surveyed to identify a change to the data processing system. One or more requests for status instructions for the one or more system items are generated, and the status instructions are compiled into a data structure. In response to determining that a status instruction is present in the data structure for which no status data has been collected, a method of collection for the instruction is determined, the collection is performed according to the method to obtain the status data, and the status data is compiled in a dump data structure.

7 Claims, 4 Drawing Sheets

| | | | | | | |
|---|---|---|---|---|---|---|
| SW | HW | SH | OTHER | getscom pu 0x400000 –nall –pall –call | 0+ | Global Fir |
| SW | HW | SH | OTHER | getscom pu 0x400101 –nall –pall –call | 0+ | recoverable fir |
| ... | ... | ... | ... | ... | ... | ... |
| SW | HW | SH | OTHER | stopClocks –call | 0+ | stop clocks |
| SW | HW | SH | OTHER | getring pu ep fpu –nall –pall –call | 0...3,5+ | CP FPU |
| SW | HW | SH | OTHER | getring pu ep fpu –nall –pall –call | 4 | CP FPU |
| SW | HW | SH | OTHER | getring pu ep tdp –nall –pall –call | 0+ | CP TDP |
| ... | ... | ... | ... | ... | ... | ... |
| NW/SH/OTHER | | | | getarray pu tlb –nall –pall –call <start index> <numb of arrays> | 0+ | all grp array |
| HW/OTHER | | | | getarray pu JERAT –nall –pfail –cfail call <start index> <numb of arrays> | 0+ | only fail grp array |
| ... | ... | ... | ... | ... | ... | ... |
| SW/HW/SH/OTHER | | | | getring ent rio –nall –pMfail –call | 0+ | enterprise RIO ring master & fail |
| OTHER | | | | getring ent sgxbs –nall –pall –call | 0+ | enterprise agxbx ring |

FIG. 3

METHOD, SYSTEM AND COMPUTER PROGRAM PRODUCT FOR GENERIC AND FLEXIBLE COLLECTION OF A HARDWARE DATA IMAGE

BACKGROUND OF THE INVENTION

1. Technical Field

The present invention relates in general to data processing systems and in particular to cataloging hardware of a data processing system. Still more particularly, the present invention relates to a system, method and computer program product for generic and flexible collection of a hardware data image.

2. Description of the Related Art

Within data processing systems, ascertaining hardware conditions in response to system events can prove tremendously useful, both in the design and engineering process and during deployment. Prior-art methods have generally relegated the task of ascertaining system hardware conditions to a firmware-based system dump process. Consequently, system dump instructions are typically hard-coded in ROM, together with the firmware configuration and startup routines. Because the system dump instructions are hard-coded in ROM, the system dump instructions can not typically be modified in response to hardware configuration changes.

The current state of the prior art increases the difficulty of updating a data processing system when the hardware configuration is changed, due to the need to update firmware that is hard-coded into ROM. Additionally, the lists of configuration change requests provided by independent hardware component manufacturers do not include checks for side-effects of requested hardware modifications and associated routine calls. System changes late in the design process or after production has begun are thereby rendered impractical.

SUMMARY OF THE INVENTION

A method of processing data is proposed. In response to determining that a reconfiguration of a data processing system has occurred, one or more system items are surveyed to identify a change to the data processing system. One or more requests for status instructions for the one or more system items are generated, and the status instructions are compiled into a data structure. In response to determining that a status instruction is present in the data structure for which no status data has been collected, a method of collection for the instruction is determined, the collection is performed according to the method to obtain the status data, and the status data is compiled in a dump data structure.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed descriptions of an illustrative embodiment when read in conjunction with the accompanying drawings, wherein:

FIG. 3 depicts a hardware dump content data structure data structure for generic and flexible collection of a hardware data image in accordance with a preferred embodiment of the present invention.

DETAILED DESCRIPTION OF THE PREFERRED EMBODIMENT

An automated method for modifying hardware dump table information is disclosed. Using the present invention, hardware changes are automatically detected. While prior art methods have been unable to perform auto-detection and to compensate for newly discovered hardware (because of hard-coding into firmware), the present invention provides much greater flexibility through modification of a hardware dump table data structure.

Figure 1:
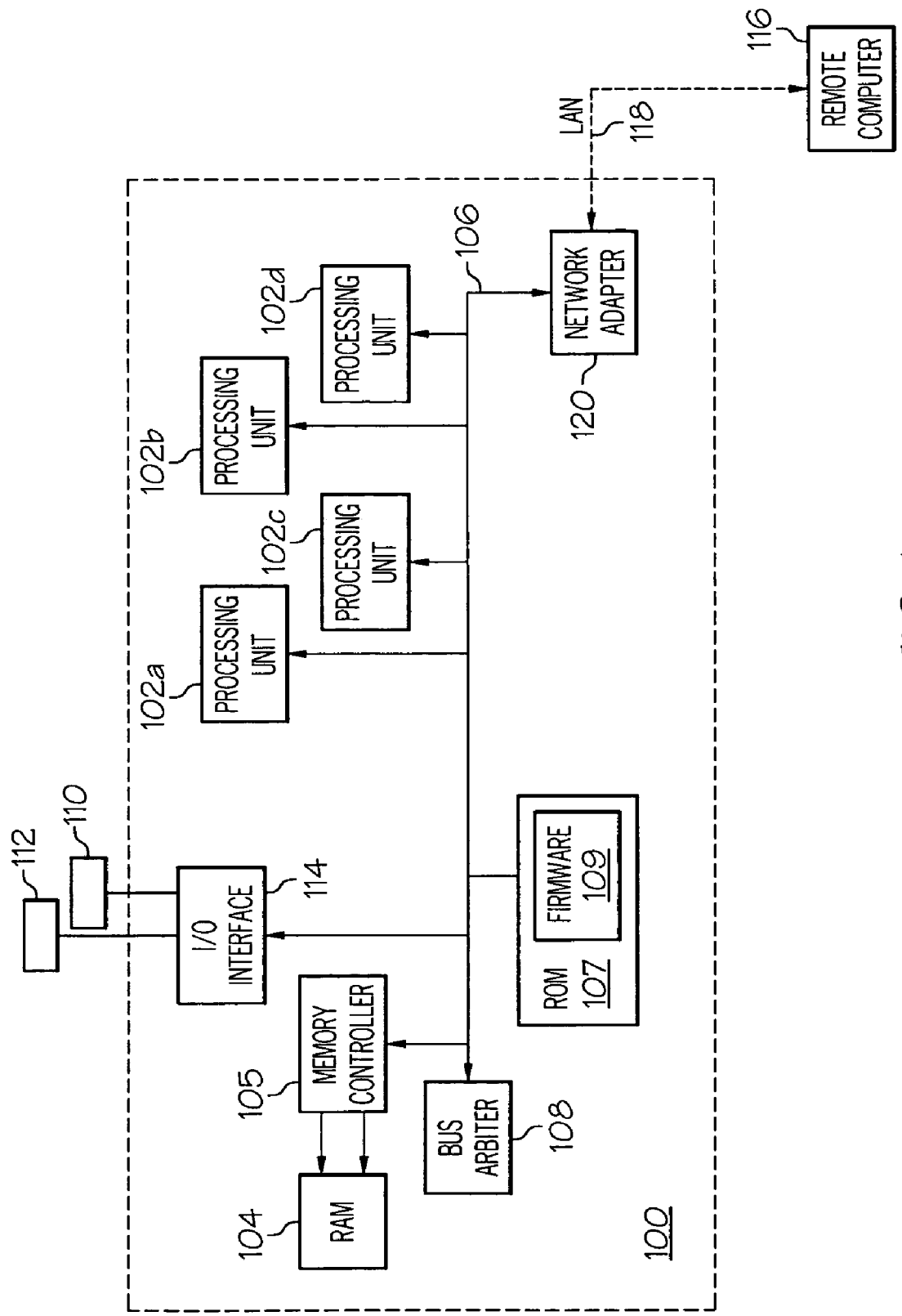
FIG. 1 depicts a block diagram of a data processing system in which a preferred embodiment of the method, system and computer program product for generic and flexible collection of a hardware data image are implemented.

With reference now to figures and in particular with reference to FIG. 1, there is depicted a data processing system 100 that may be utilized to implement the method, system and computer program product of the present invention. For discussion purposes, the data processing system is described as having features common to a server computer. However, as used herein, the term "data processing system," is intended to include any type of computing device or machine that is capable of receiving, storing and running a software product, including not only computer systems, but also devices such as communication devices (e.g., routers, switches, pagers, telephones, electronic books, electronic magazines and newspapers, etc.) and personal and home consumer devices (e.g., handheld computers, Web-enabled televisions, home automation systems, multimedia viewing systems, etc.).

FIG. 1 and the following discussion are intended to provide a brief, general description of an exemplary data processing system adapted to implement the present invention. While parts of the invention will be described in the general context of instructions residing on hardware within a server computer, those skilled in the art will recognize that the invention also may be implemented in a combination of program modules running in an operating system. Generally, program modules include routines, programs, components and data structures, which perform particular tasks or implement particular abstract data types. The invention may also be practiced in distributed computing environments where tasks are performed by remote processing devices that are linked through a communications network. In a distributed computing environment, program modules may be located in both local and remote memory storage devices.

Data processing system 100 includes one or more processing units 102a-102d, a system memory (RAM) 104 coupled to a memory controller 105, and a system interconnect fabric 106 that couples memory controller 105 to processing unit(s) 102 and other components of data processing system 100. Commands on system interconnect fabric 106 are communicated to various system components under the control of bus arbiter 108.

Data processing system 100 further includes non-volatile storage media, such as a first hard disk drive 110 and a second hard disk drive 112. First hard disk drive 110 and second hard disk drive 112 are communicatively coupled to system interconnect fabric 106 by an input-output (I/O) interface 114. Although hard disks are described above, it should be appreciated by those skilled in the art that other types of media which are readable by a computer, such as a removable magnetic disks, CD-ROM disks, magnetic cassettes, flash memory cards, digital video disks, Bernoulli cartridges, and other later-developed hardware, may also be used to provide non-volatile data storage in the exemplary computer operating environment. Additional non-volatile storage is provided in ROM 107, which contains firmware 109 for performing various essential system operations.

Data processing system 100 may operate in a networked environment using logical connections to one or more remote computers, such as remote computer 116. Remote computer 116 may be a server, a router, a peer device or other common network node, and typically includes many or all of the elements described relative to data processing system 100. In a networked environment, program modules employed by data processing system 100, or portions thereof, may be stored in a remote memory storage device, such as remote computer 116. The logical connections depicted in FIG. 1 include connections over a local area network (LAN) 118, but, in alternative embodiments, may include a wide area network (WAN).

When used in a LAN networking environment, data processing system 100 is connected to LAN 118 through an input/output interface, such as a network adapter 120. It will be appreciated that the network connections shown are exemplary and other means of establishing a communications link between the computers may be used.

Figure 2:
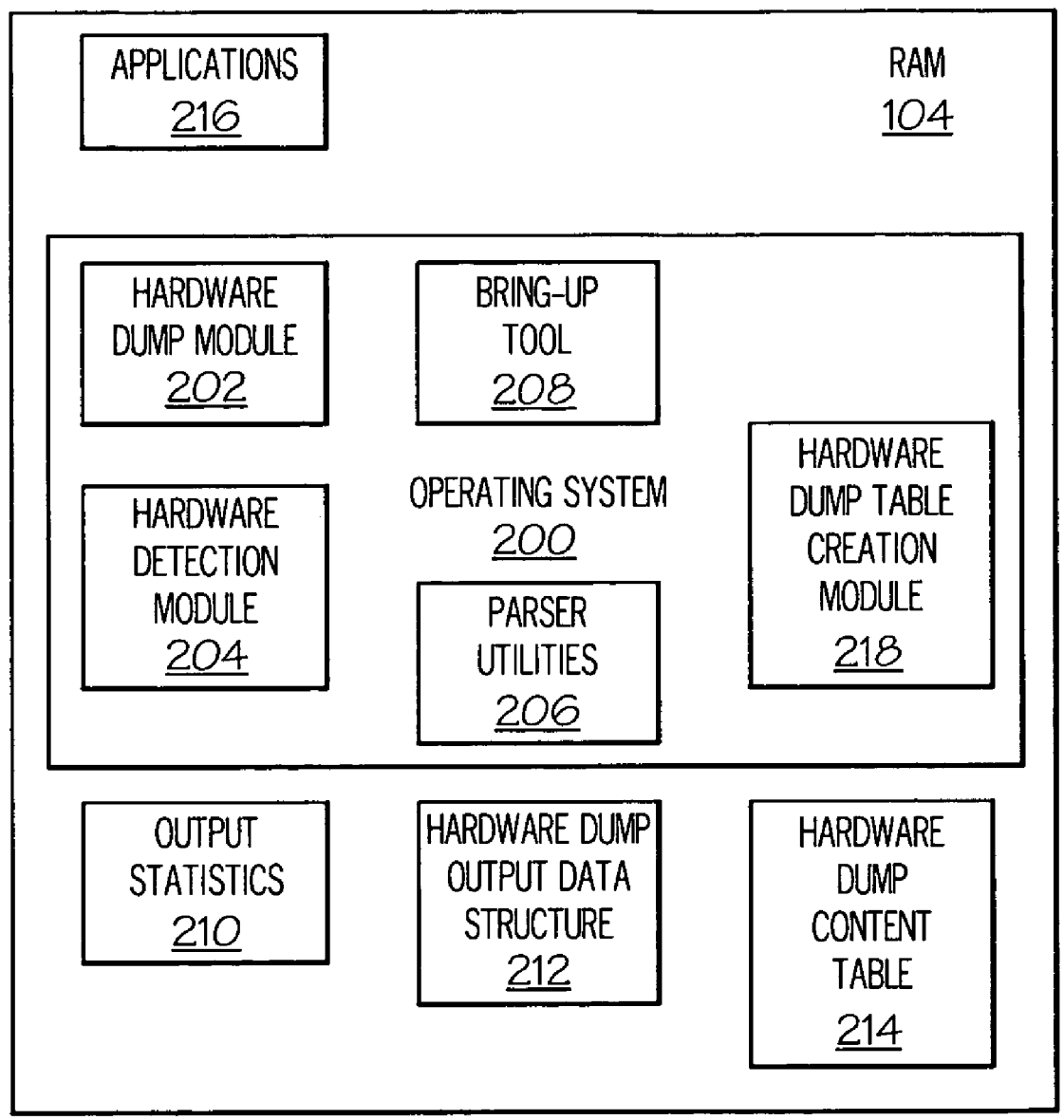
FIG. 2 illustrates software components and data structures, contained in a memory, for performing generic and flexible collection of a hardware data image in accordance with a preferred embodiment of the present invention.

Turning now to FIG. 2, a set of software components and data structures, contained in a memory, for performing generic and flexible collection of a hardware data image in accordance with a preferred embodiment of the present invention is illustrated. In one embodiment, RAM 104 contains an operating system 200 allowing applications 216, which perform a variety of tasks, to interface with processors 102a-102d, RAM 104, bus arbiter 108, first hard disk drive 110 and second hard disk drive 112. Operating system 200 contains a hardware dump module 202, a hardware detection module 204, parser utilities 206, a hardware dump table creation module 218 and a bring-up tool 208. RAM 104 also contains a data structure containing output statistics 210, a hardware dump output data structure 212, and a hardware dump content table 214. Hardware dump module 202 collects hardware data on the basis of commands contained in hardware dump content table 214 and prepares hardware dump output data structure 212 and output statistics 210. Bring-up tool 208 provides hardware configuration support, and informs hardware dump table creation module 218 of the need to receive new hardware data from hardware detection module 204.

Referring now to FIG. 3, a hardware dump content data structure for generic and flexible collection of a hardware data image in accordance with a preferred embodiment of the present invention is depicted. Hardware dump content table 214 contains a plurality of entries 300a-300n. Each entry contains a content field 304, a command field 306, an EC (Engineering Changes) exclusion field 308, and an optional comment field 310. Commands in hardware dump content table 214 increase the flexibility of hardware dump module 202, enabling efficient interface with bring-up tool 208 for use during all hardware (and software) bring up operations.

Content field 304 is a set of logical bit flags used to signal to hardware dump module 202 under what conditions the linked commands in command field 306 should be executed. There are several defined conditions that can lead to collection of data, each represented by the setting of flags in subfields of content field 304.

A software (SW) subfield 320 is provided for designating instructions to run in response to software error conditions, including commands that need to be gathered to analyze errors that are specific to software-related dump transitions.

A five-bit hardware (HW) subfield 322 supports hardware-related error codes:

A HWPROC error code identifies an instruction for use in situations in which a hardware processor error condition was encountered, indicating commands that need to be executed to analyze errors that are specific to a hardware processor.

A HWCORE error code identifies an instruction for use in situations in which a hardware processor error condition was encountered and caused a core checkstop.

A HWHUB error code identifies an instruction for use in situations in which an error in a hardware input-output (I/O) interface 114 was encountered.

A HWBRDG error code identifies an instruction for use in situations in which a hardware I/O bridge error condition in input-output (I/O) interface 114 was encountered.

A HWSMA error code identifies an instruction for use in situations in which a hardware SMA (serial microprocessor array) error condition was encountered.

Additionally, an integrated software and hardware (SH) subfield 324 identifies commands that need to be executed to analyze errors that could have been caused by either software or hardware related dump transitions. An other conditions (OTHER) subfield 326 identifies instructions for a custom list of errors utilized in debug lab operation.

The command field 306 contains the supported command that can be parsed by hardware dump module 202. These commands include getring, getscom and getarray operations as well as stopclock command. The "getscom" command is executed to gather data from active logic, while "getring" gathers data from inactive logic and the "getarray" command gathers groups of data and packages them into a single block (i.e. many "getring" calls all put together). Stopclock provides the stopping of all active logic. An example syntax for each command in hardware dump content table 214 is listed below:

```
getscom <chip type> <address> -n[node group] -p[position group]
-c[core group] getring <chip type> <ring stringname> -n[node group]
-p[position group] -c[core group] getarray <chip type>
    <array string name> -n[node group] -p[position group]
-c[core group] stopClocks -c[core group]
```

The node group parameter can have the following exemplary values and meanings, wherein each node represents a processor group:

all—All nodes in the system will be gathered.

fail—Only the node related to the failing processor, cache, I/O hub or other resource will be gathered.

x—A single node will be gathered. This option is to be used primarily by OTHER content.

The position group parameter can have the following exemplary values and meanings, wherein position represents the designation of a particular item or resource within a node:

all—All positions in the system will be gathered.

fail—Only the position related to the failing processor, cache, I/O hub or other resource will be gathered.

Mfail—only the (failing) master and position related to the failing I/O hub will be gathered. This option is used primarily by (enterprise) hardware.

x—A single position will be gathered. This option is to be used primarily by OTHER content.

The core group parameter can have the following exemplary values and meanings:

all—All core values will be gathered.

fail—Only core positions related to the failing processor will be gathered.

x—A single core will be gathered. This option is to be used primarily by OTHER content.

EC exclusion field 308 is used to filter specific commands to different engineering change levels of hardware, such that, as hardware changes are made, data collected will be dependent on the hardware in the data processing system 100. The optional comment field 310 is used for readability of hardware dump content table 214, allowing further human-readable description of what operation each commandss represents.

Hardware dump content table 214 allows a subset of the elements (recorded as entries 300a-300n) to be extracted to analyze the particular source of error that initiated a hardware dump by operating system 200. This extraction is possible because the error type information in content field 304 is part of each of entries 300a-300n. Hardware dump content table 214 contains generic commands in command field 306 of entries 300a-300n. These commands abstract the dump operation by hardware dump module 202 from the hardware calls themselves and allows better interaction with parser utilities 208.

The defined structure of hardware dump content table 214 permits parser utilities 208 to be provided with tools to verify syntax of the commands and also allows for quick estimates of dump data size. After performance times become known, the dump collection times are compiled in an output statistics data structure 210. The command interface of hardware dump content table 214 for data collection will also allow personnel and automated tools to modify hardware dump content table 214 at runtime to gather more (or less) data specific to system configurations in lab environments without having to change the firmware 109. As system items, which will generally include hardware but may include software in some embodiments, are added or removed, changes hardware dump content table 214 will accommodate the new configuration.

Figure 4:
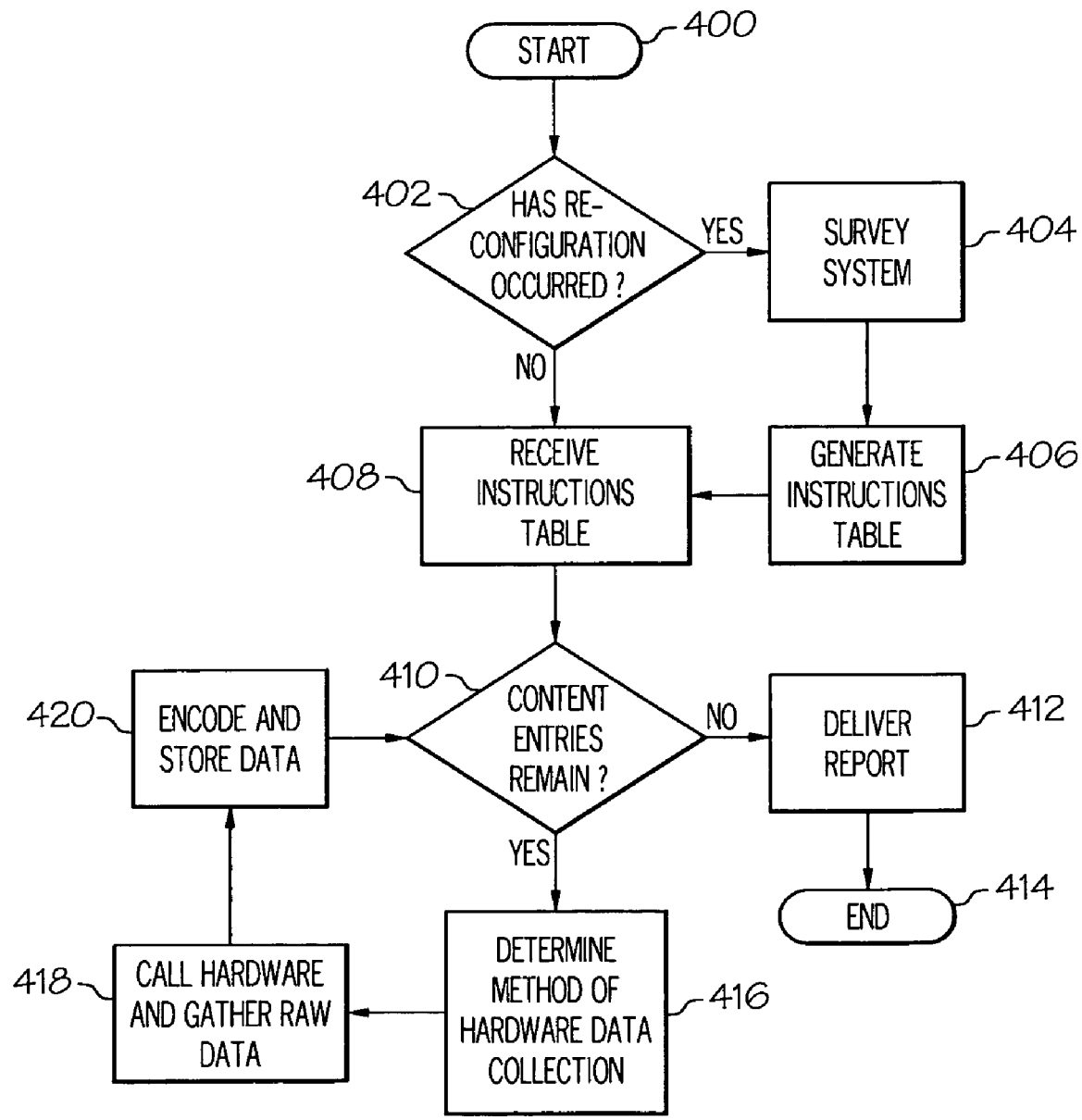
FIG. 4 depicts a high-level logical flowchart of a method for performing generic and flexible collection of a hardware data image in accordance with a preferred embodiment of the present invention.

Turning now to FIG. 4, a high-level logical flowchart of a method for performing generic and flexible collection of a hardware data image in accordance with a preferred embodiment of the present invention is illustrated. The process starts at step 400, and then moves to step 402, which depicts operating system 200 querying bring-up tool 208 to determine if a reconfiguration of hardware has occurred. If bring-up tool 208 informs operating system 200 that a reconfiguration of hardware has not occurred, then the process moves to step 408, which is described below. Otherwise, if bring-up tool 208 informs operating system 200 that a reconfiguration of hardware has occurred, then the process proceeds to step 404, which illustrates hardware detection module 204 performing a survey of system hardware (to determine what hardware is present), which hardware detection module 204 makes available to hardware dump table creation module 218. The process then moves to step 406. At step 206, hardware dump table creation module 218 creates hardware dump content table 214, utilizing the results of the system survey performed by hardware detection module 204.

The process next advances to step 408, which illustrates hardware dump module 202 receiving hardware dump content table 214. Hardware dump module 202 is instructed at the start of a dump transition what general content of hardware it should collect. An example would be a checkstop condition that was caused by a software operation in applications 216. Hardware dump module 202 would parse, using the parser utilities 208, the hardware dump content table 214 so that only the elements needed to analyze a software error would be gathered. Consequently minimum amount of data is gathered to analyze the type of error detected. The process then proceeds to step 410, which depicts hardware dump module 202 determining whether an entry 300 exists in hardware dump content table 214 for which no status data has been collected. If hardware dump module 202 determines that no entry 300 exists in the hardware dump content table 214 for which no status data has been collected, then the process moves to step 412. Step 412 illustrates hardware dump module 202 delivering a status report in the form of a hardware dump output data structure 212. The process then ends at step 414. If hardware dump module 202 determines that an entry 300 exists in the hardware dump content table 214 for which no status data has been collected, then the process moves to step 416.

Step 416 depicts hardware dump module 202 using parser utilities 206 to determine the method of hardware data collection applicable to entry 300 in hardware dump content table 214 for which no status data has been collected. The process next proceeds to step 418, which illustrates hardware dump module 202 calling the appropriate hardware and gathering raw data in accordance with the method determined by parser utilities 206. The process next moves to step 420. At step 420, hardware dump module 202 encodes and stores as a part of hardware dump output data structure 212 the data retrieved in step 418.

While the invention has been particularly shown as described with reference to a preferred embodiment, it will be understood by those skilled in the art that various changes in form and detail may be made therein without departing from the spirit and scope of the invention. It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or CD ROMs and transmission type media such as analog or digital communication links.

What is claimed is:

1. A method of processing data, said method comprising:
   in response to determining that a reconfiguration of a data processing system has occurred, surveying one or more system items to identify a change to said data processing system;
   generating one or more requests for status instructions for said one or more system items;
   compiling said one or more requests for status instructions into a collection instructions data structure; and
   in response to determining that a status instruction is present in said collection instructions data structure for which no status data has been collected:
      determining a method of collection for said instruction;
      performing said collection according to said method to obtain said status data; and
      compiling said status data into a dump data structure.

2. The method of claim 1, further comprising the step of, in response to determining that no instructions exist for which no status data has been collected, encoding and storing said status data.

3. The method of claim 1, wherein said step of compiling said one or more requests for status instructions into said collection instructions data structure further comprises the step of compiling said one or more requests for status instructions into said collection instructions data structure containing a content-to-collect field, an executable command field, a control field, and a comment field.

4. The method of claim 1, wherein said step of compiling said one or more requests for status instructions into said collection instructions data structure further comprises the step of compiling said one or more requests for status instructions into said collection instructions data structure containing a content-to-collect field for specifying a collection of one or more items of data related to a software error condition.

5. The method of claim 1, wherein said step of compiling said one or more requests for status instructions into said collection instructions data structure further comprises the step of compiling said one or more requests for status instructions into said collection instructions data structure containing a content-to-collect field for specifying a collection of one or more items of data related to a hardware error condition.

6. The method of claim 1, wherein said step of compiling said one or more requests for status instructions into said collection instructions data structure further comprises the step of compiling said one or more requests for status instructions into said collection instructions data structure containing a content-to-collect field for specifying a collection of one or more items of data related to a debug operation.

7. The method of claim 1, wherein said step of compiling said one or more requests for status instructions into said collection instructions data structure further comprises the step of compiling said one or more requests for status instructions into said collection instructions data structure containing a content-to-collect field for specifying a collection of one or more items of data related to a hardware error with a core checkstop.

\* \* \* \* \*